United States Patent [19]

Hack

[11] 4,408,975

[45] Oct. 11, 1983

[54] TABLET PRESS

[75] Inventor: Adolf Hack, Sinnersdorf, Fed. Rep. of Germany

[73] Assignee: Emdener Strasse, Cologne, Fed. Rep. of Germany

[21] Appl. No.: 328,939

[22] Filed: Dec. 9, 1981

[30] Foreign Application Priority Data

Dec. 31, 1980 [DE] Fed. Rep. of Germany ....... 3049597

[51] Int. Cl.³ ............................................. B30B 11/08
[52] U.S. Cl. .................................. 425/231; 425/345; 425/353; 425/354
[58] Field of Search ................. 425/345, 353, 354, 78, 425/210, 231, 227

[56] References Cited

U.S. PATENT DOCUMENTS

| | | | |
|---|---|---|---|
| 2,989,781 | 6/1961 | Frank | 425/345 |
| 3,999,922 | 12/1976 | Shimada | 425/210 |
| 4,104,014 | 8/1978 | Pearce | 425/345 |
| 4,145,174 | 3/1979 | Goloskov et al. | 425/78 |
| 4,292,017 | 9/1981 | Doepel | 425/345 |

FOREIGN PATENT DOCUMENTS 2914201 10/1980 Fed. Rep. of Germany .

*Primary Examiner*—Lorenzo B. Hayes
*Attorney, Agent, or Firm*—Body, Vickers & Daniels

[57] ABSTRACT

A tablet press (10) comprises a plurality of dies (17), a plurality of upper rams (18) and lower rams (19) each having a ram shaft (20, 21), a plurality of ram guides (22, 23), and support means (13, 14, 15) for supporting the dies and the ram guides, the arrangement being such that each ram (18, 19) is mounted for reciprocation in an associated one of said ram guides (22, 23) and each pair of one of said upper rams (18) and one of said lower rams (19) cooperates with a respective one of said dies (17); the press further comprising an upper intermediate wall (28) having a plurality of holes (34), one for the passage of each upper ram shaft (20), the upper intermediate wall (28) engaging at its edges with the support means (13) to form a dust barrier between the dies (17) and the upper ram guides (18), and a lower intermediate wall (28') having a plurality of holes (34), one for each lower ram shaft (21), the lower intermediate wall (28') engaging at its edges with the support means (14), to form a dust barrier between the dies and the lower ram guides.

12 Claims, 4 Drawing Figures

TABLET PRESS

FIELD OF THE INVENTION

This invention relates to a tablet press. It is particularly suitable for rotary tablet presses with a rotating die table, having upper and lower rams which are guided for reciprocation coaxially to the dies, in ram guides of a press frame or of a die table, and the shafts of which are provided with dust-protection devices.

BACKGROUND OF THE INVENTION

In tablet presses, especially in rotary tablet presses which work at high rotational speeds, a considerable amount of dust is produced when the dies are filled and the tablets are pressed, and this leads to soiling of all the moving parts of the machine and impairs their free mobility. The dust settling on the shaft of the rams can penetrate from there into the ram guides in the die table or in the press frame, where the dust is mixed with the lubricant and impairs or completely cancels its lubricating effect, so that the rams slide in their guides only with difficulty and can jam, thus leading to considerable machine damage.

To reduce the production of dust, it is known, in high-performance presses to extract the dust by generating a partial vacuum. However, this often results in even quicker soiling of the sensitive machine parts and the valuable material for pressing due to the increase in air movement which is caused.

To protect the ram guides against soiling, it has also already been suggested that one fasten to the individual shafts of the rams cap-type gaskets, cup-type dust traps or ramp-type dust deflectors which move up and down with the rams (German Patent Specification No. 2 462 102 and German Patent Specification No. 2 424 655). However, these dust deflectors keep only coarse dust particles away from the sliding guides which slide along on the rams in the immediate vicinity of the latter. Fine dust swirling round in the machine is not collected by them, but can settle directly on the ram shafts and even penetrate into the ram guides.

The object of the invention is to provide a very simple device which can be produced at moderate cost and by means of which the access of dust to the ram guides is prevented, and which can also be attached easily and quickly to existing presses and removed easily and quickly for maintenance and repair purposes.

SUMMARY OF THE INVENTION

According to the invention there is provided a tablet press comprising a plurality of dies, a plurality of upper and lower rams each having a ram shaft, a plurality of ram guides, and support means for supporting the dies and the ram guides, the arrangement being such that each ram is mounted for reciprocation in an associated one of said ram guides, and each pair of one of said upper and one of said lower rams cooperates with a respective one of said dies; the press further comprising an upper intermediate wall having a plurality of holes, one for the passage of each upper ram shaft, the upper intermediate wall engaging at its edges with the support means to form a dust barrier between the dies and the upper ram guides, and a lower intermediate wall having a plurality of holes, one for each lower ram shaft, the lower intermediate wall engaging at its edges with the support means, to form a dust barrier between the dies and the lower ram guides.

This design has the advantage that the ram guides can be hermetically sealed off from the dies positioned in a die plate where dust is initially produced. Consequently, dust swirling round can no longer reach up to those parts of the ram shafts which slide in the ram guides.

The prevent dust from penetrating at the point where the ram shafts pass through the intermediate walls, the spaces between the intermediate walls and the ram guides can be under slight excess pressure, so that air is blown outwards at the places where the rams pass through.

It is especially convenient if the intermediate walls consist of an elastomeric material and are fastened both to the support means, which may be a press frame or a die table and to the rams. An air-tight and dust-proof connection of the intermediate walls to both the machine parts carrying the ram guides and to the rams reciprocating in the guides is thus possible as a result.

Where the support means comprises a rotatable die table formed with a central neck, the upper intermediate wall can be fastened and removed again easily by having its inner edge clamped to the neck by means of a clamping ring, a clamping strip or the like. The inner edge of the lower intermediate wall can be fastened in like manner. The outer edge of each intermediate wall can suitably engage over a respective outer peripheral edge of the die table by means of a flange. So that the axial movements of the rams in the ram guides are not impeded by the intermediate wall fastened to them, it is expedient if the flange of the respective intermediate wall rests slidingly against the outer peripheral edge of the die table. With sufficient elasticity of the intermediate wall, its outer edge can also engage by means of a bead into a groove in the outer peripheral edge of the die table or can be fastened releasbly in some other way to the outer peripheral edge of the die table.

Another embodiment of the invention has the outer edge of the upper intermediate wall resting resiliently against the outer edge of a portion of the die table spaced from and facing the die plate and, in the region of the press station, runs along on a curved segment which is located fixedly there and which limits outwardly, in the region of the press station, the space between the intermediate wall and the ram guides.

For a simple and dust-proof connection of the rams to the intermediate walls, the latter can have, in the region of the rams, holes which have a smaller diameter than the shafts of the rams. The rams are then provided with circumferential annular grooves, by means of which they engage sealingly into the holes in the upper and lower intermediate walls. Such a design permits, on the one hand, a leak-proof connection of the intermediate walls to the individual rams and, on the other hand, a simple installation of the intermediate walls into and easy removal of the latter out of the machine when this is to be serviced or when it is necessary to replace some or all of the press rams.

To increase the elasticity of the intermediate wall, this can have appropriately at least one extendable or bellows fold. Assembly and removal of the intermediate walls is made substantially easier if they are designed as a split ring, split at least along one radius and the split edges of which can be connected releasably to one another. The split edges of each annular intermediate wall can be perforated and can be connected to one another by a connecting piece which has elongate projections, for example pins or a spring coil, which are inserted through the perforations in the split edges.

The invention can be used not only in rotary tablet presses with a die table extending round horizontally, but also in other tablet presses which have only a few die bores or the die bores of which are located in a die plate extending round in a vertical plane.

By way of example there will now be described, with reference to the accompanying drawings a preferred embodiment of the invention. In the drawings:

DESCRIPTION OF THE PREFERRED EMBODIMENT

Figure 1:
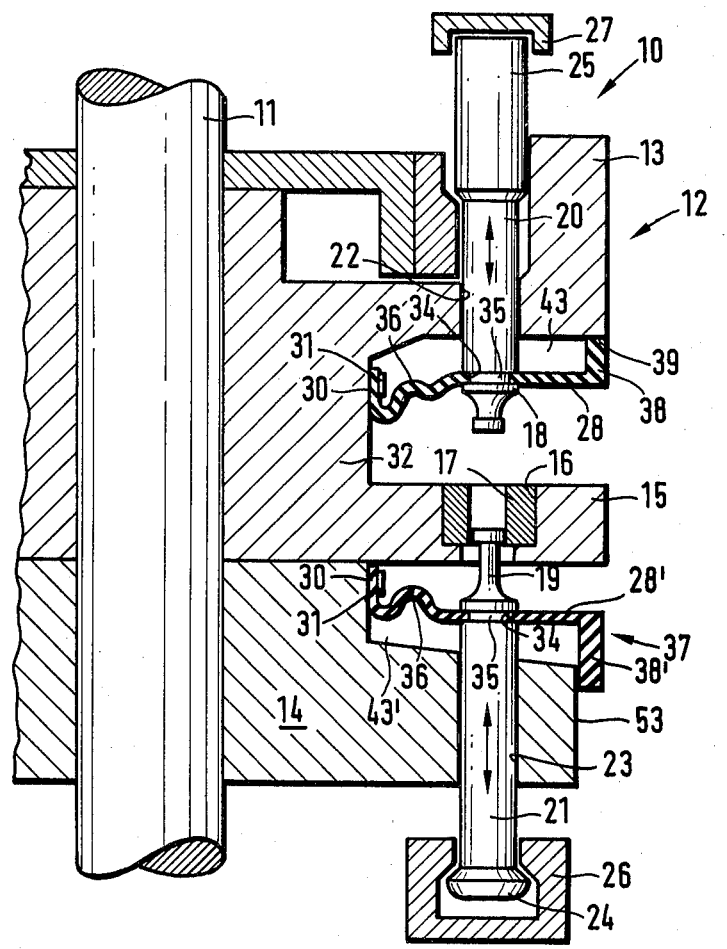
FIG. 1 is a partial vertical section of a rotary tablet press according to the invention, at a point located between a filling station and a press station.

In the drawings, 10 designates a rotary tablet press, in which a horizontal die table 12 rotating on a main shaft 11 comprises an upper ram guide ring 13 and a lower ram guide ring 14 which are connected to one another in a suitable way. The upper ram guide ring 13 carries on its underside die plate 15 in which die bores 16 are arranged in a circle in which dies 17 rest. Coaxially to the dies 17, and in the die table 12, upper ram 18 is located in the upper ram guide ring 13 and lower ram 19 in the lower ram guide ring 14, and the shafts 20 and 21 respectively of the rams are guided slidingly in ram guides 22 and 23 respectively.

As is known per se, an upper ram 18 and a lower ram 19 are assigned to each die 17, and their outer ends 24 and 25 respectively slide in slide rails 26 and 27 respectively, which control the up-and-down movement of the rams 18 and 19 during rotation of the press.

Figure 2:
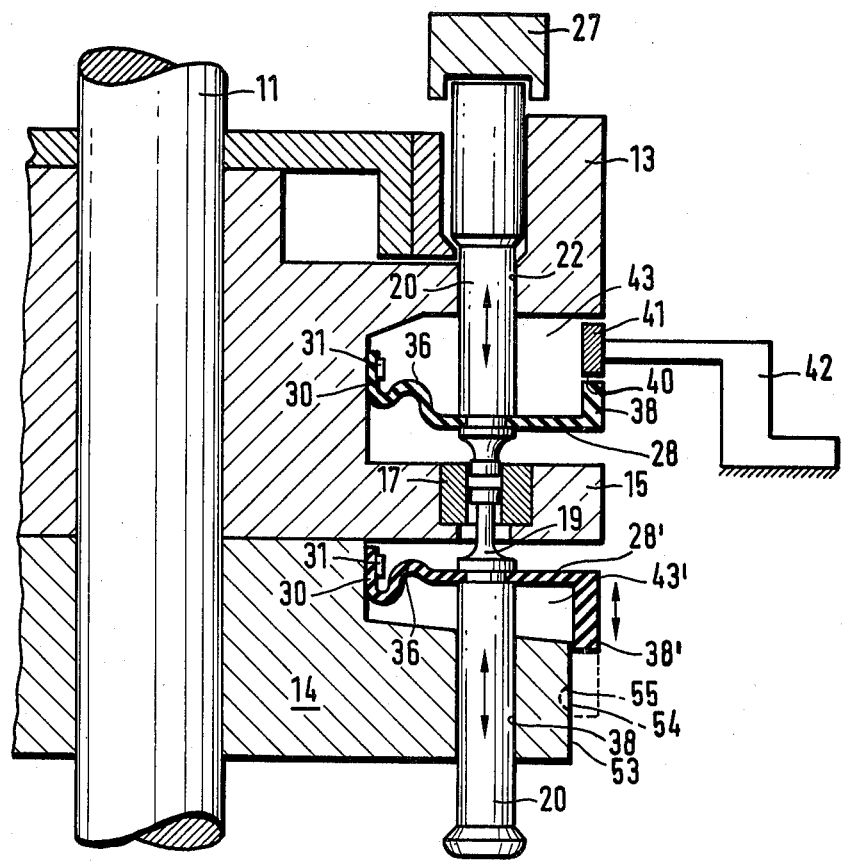
FIG. 2 is a partial vertical section of the tablet press according to FIG. 1, in the region of the press station.

It may be seen from FIGS. 1 and 2 that an upper intermediate wall 28 is located between the die plate 15 and dies 17 arranged therein and the guides 22 of the upper ram 18. Likewise, a lower intermediate wall 28' is provided between the dies 17 and the ram guides 23 of the lower rams 19. Each intermediate wall 28 and 28' respectively consists of a ring made of elastomeric material, for example rubber, an elastic plastics material or some other elastomer, and serves for sealing off the ram guides 22 and 23 respectively.

Figure 3:
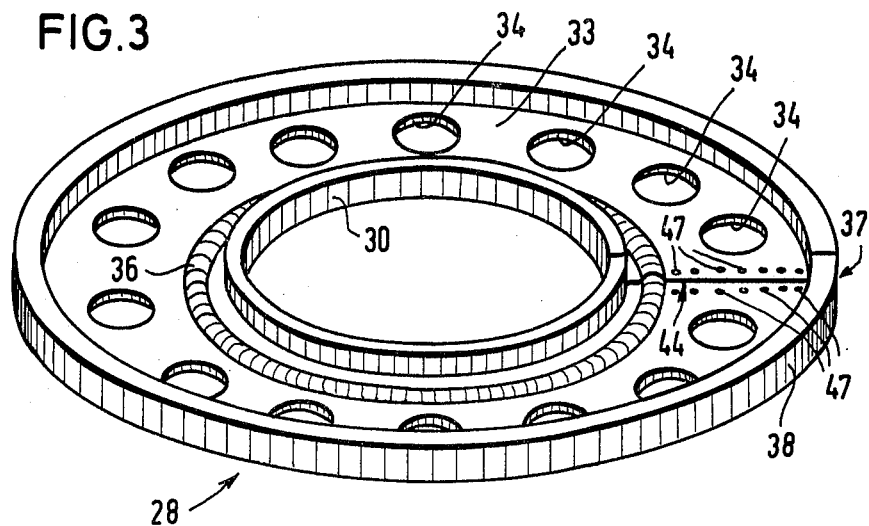
FIG. 3 is a perspective view of an intermediate wall for sealing off the ram guides of the press of FIGS. 1 and 2.
Figure 4:
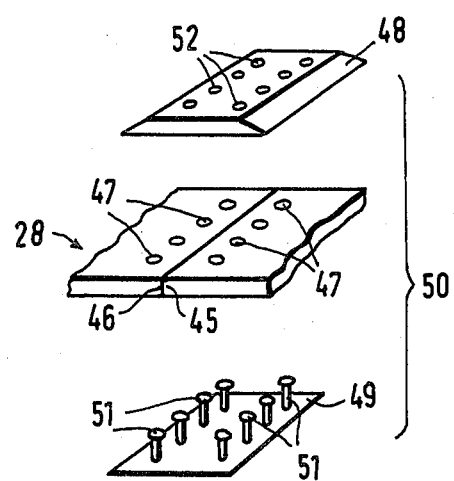
FIG. 4 is an exploded perspective view of the juncture of the split edges of the intermediate wall illustrated in FIG. 3.

The upper intermediate wall 28 is illustrated in more detail in FIG. 3. It has a raised inner edge 30 which is clamped to neck 32 of the die table by means of a clamping ring 31, or a clamping strip or the like. A hole 34 is provided in the annular wall 33 for each upper ram 18, and this hole has a somewhat smaller diameter than the shaft of the associated upper ram, the latter engaging sealingly into this hole by means of a circumferential annular groove 35. So that the intermediate wall 28 fastened by means of its inner edge 30 to the die neck 32 can follow the up-and-down movements of the upper rams 20, it has a bellows fold 36 in the vicinity of its inner edge 30.

At its outer edge 37, the intermediate wall 28 has a flange 38 which is directed upwards and which rests against outer edge 39, of the upper ram guide ring 13 which outer edge 39 faces the die plate 15. When the upper rams move downwards in the region of the press station, in order to compress the powder in the die 17 into a tablet (FIG. 2), the upper edge of the flange 38 runs along on lower curved edge 40 of curved segment 41 located fixedly on an arm 42 or the like in the region of the press station. The lower curved edge 40 conforms to the downward and upward movement of the upper rams 18 as they are rotated about shaft 11. Space 43 between the upper ram guide ring 13 and the intermediate wall 28 thereby remains closed even in the region of the press station, so that dust cannot reach up to the ram guides 22 from outside.

Referring again to FIG. 3, it may be seen that the annular intermediate wall 28 shown there is split along a radius 44. Perforations consisting of several holes 47 are located next to each of the two split edges 45 and 46. A connecting piece consisting of an upper half 48 and a lower half 49 is provided for connecting the split edges 45 and 46. The lower half 49 of the connecting piece 50 has several pins 51, whose distance apart corresponds to the distance between the holes 47 and which are inserted from below into the holes 47 in the split edges 45 and 46 of the intermediate wall 28. The pins 51 project above the surface, so that the upper part 48 of the connecting piece 50, which is itself provided with holes 52 into which fit the pins 51 of the lower part 49 of the connecting piece 50, can be attached from above. Simply by plugging the two parts of the connecting piece together with the split edges 45 and 46 of the intermediate wall 28 which are located between then, the intermediate wall can be closed to form a ring and can also be opened easily again after the connecting piece 50 has been removed.

The intermediate wall 28' between the lower ram guide ring 14 and the die plate 15 corresponds substantially to the upper intermediate wall 28. Here however, the flange 38' at the outer edge 37 of the intermediate wall is longer in an axial direction and engages over the outer peripheral wall 53 of the die table 12. The flange 38' rests slidably against the outer peripheral edge 53 of the die table 12 and reliably seals off the space 43' between the lower ram guide 23 and the die plate 15 even when the lower plungers 19 move upwards in the die 17 during pressing of the tablets.

In an alternative embodiment where there is sufficient elasticity of the intermediate walls 28 and 28' respectively, the flanges 38 and 38' of either or both walls can also be provided on their inner sides with a bead 54 which engages into a depression 55 on the outer peripheral edge 53 of the die table 12, as is indicated by broken lines in FIG. 2 for wall 28'. Instead of this, it is also possible to clamp by means of a clamping ring, or to screw firmly, or even to glue directly the outer flanges 38 and 38' respectively of the intermediate walls 28 and 28' respectively to the outer peripheral edge 53. Advantageously, however, the intermediate wall is only clamped and not glued or otherwise firmly fixed so that it can be taken out easily during cleaning of the machine.

Since the spaces 43 and 43' respectively between the intermediate walls 28 and 28' respectively, on the one hand, and the ram guides 22 and 23 respectively, on the other hand, are closed on all sides, it is possible to generate slight excess pressure in the sealed-off space by blowing in air. Additional protection against penetration of dust is obtained as a result.

The invention is not restricted to the exemplary embodiment, for example, it is also possible to make the intermediate walls 28 and 28' substantially rigid and to guide the rams 18 and 19 in the holes 34. If, in this case, the spaces 43 and 43' are kept under slight excess pressure, no dust can penetrate inside them at the places where the plungers 18 and 19 pass through the holes 34. It would also be conceivable to omit part 42 or to replace it by a type of air curtain.

What is claimed is:

1. In a tablet press comprising a plurality of dies, a plurality of upper and lower rams each having a ram shaft, a plurality of ram guides, and support means for supporting the dies and the ram guides, the arrangement being such that each ram is mounted for reciprocation in an associated one of said ram guides, and each pair of one of said upper and one of said lower rams cooperates with a respective one of said dies; the improvement comprising an upper intermediate wall generally perpendicular to the axis of said upper ram shafts having a plurality of holes, one for the passage of each upper ram shaft, means for maintaining the relative position of said wall with respect to each of said upper ram shafts, said upper intermediate wall engaging at its edges with the support means to form a dust barrier between the dies and the upper ram guides, and a lower intermediate wall generally perpendicular to the axis of said lower ram shafts having a plurality of holes, one for each lower ram shaft means for maintaining the relative position of said wall with respect to each of said lower ram shafts, said lower intermediate wall engaging at its edges with the support means, to form a dust barrier between the dies and the lower ram guides.

2. Press as claimed in claim 1, wherein there is a space between the upper intermediate wall and the upper ram guides and a space between the lower interemdiate wall and the lower ram guides, and means are provided for pressurising the air in these spaces.

3. Press as claimed in claim 1, wherein each of the upper and lower intermediate walls is of elastomeric material, and each is fastened to the upper or lower rams respectively and also to the support means.

4. Press as claimed in claim 1 wherein the support means comprises a rotatable die table having a central neck, and the press further comprises clamping means for clamping the upper intermediate wall to the neck.

5. Press as claimed in claim 1 wherein one of the upper and lower intermediate walls comprises an outer peripheral flange, and the support means comprises an outer peripheral edge over which said flange engages.

6. Press as claimed in claim 5 wherein the flange is in sliding engagement with the outer peripheral edge.

7. Press as claimed in claim 5 wherein the outer edge is formed with a groove and the flange is formed with a bead which engages in the groove.

8. Press as claimed in claim 1 wherein the support means comprises a rotatable die table having a first portion for mounting the dies, and spaced above the first portion a second portion in which the ram guides are formed; wherein further there is provided between the first and second portions a non-rotatable curved segment at one peripheral part of the rotatable die table defining a press station, which segment lies adjacent the second portion; and wherein the upper peripheral wall is formed with an outer edge which resiliently abuts against the second portion except at the press station where it abuts against the curved segment.

9. Press as claimed in claim 1 wherein said maintaining means comprises each of the ram shafts having a circumferential groove, and the intermediate walls being each made of elastomeric material and their holes from the ram shafts being of smaller diameter than the ram shafts and the hole edges resiliently engaging in the circumferential groove of each ram shaft.

10. Press as claimed in claim 1 wherein each of the intermediate walls is made of elastomeric material and is formed with an extendable fold.

11. Press as claimed in claim 1 wherein at least one of the upper or lower intermediate walls is formed as a split ring, and releasable means are provided for connecting the split edges to one another.

12. Press as claimed in claim 11 wherein there are perforations at the split edges on each side and the releasable means has elongate projections for insertation through the perforations.

* * * * *

UNITED STATES PATENT AND TRADEMARK OFFICE
CERTIFICATE OF CORRECTION

PATENT NO. : 4,408,975
DATED : October 11, 1983
INVENTOR(S) : Adolf Hack

It is certified that error appears in the above-identified patent and that said Letters Patent is hereby corrected as shown below:

On the title page:

The claim of priority based on Federal Republic of Germany application 3049597 has been supported with the submission of a certified copy of Federal Republic of Germany application 3049597.

Signed and Sealed this

First Day of May 1984

[SEAL]

*Attest:*

*Attesting Officer*

GERALD J. MOSSINGHOFF

*Commissioner of Patents and Trademarks*